I. N. WARD & H. R. WHITE.
HAY AND COTTON PRESS.

No. 182,975.  Patented Oct. 3, 1876.

WITNESSES:
W. W. Hollingsworth
Solon C. Kemon

INVENTOR:
I. N. Ward
H. R. White
BY
ATTORNEYS.

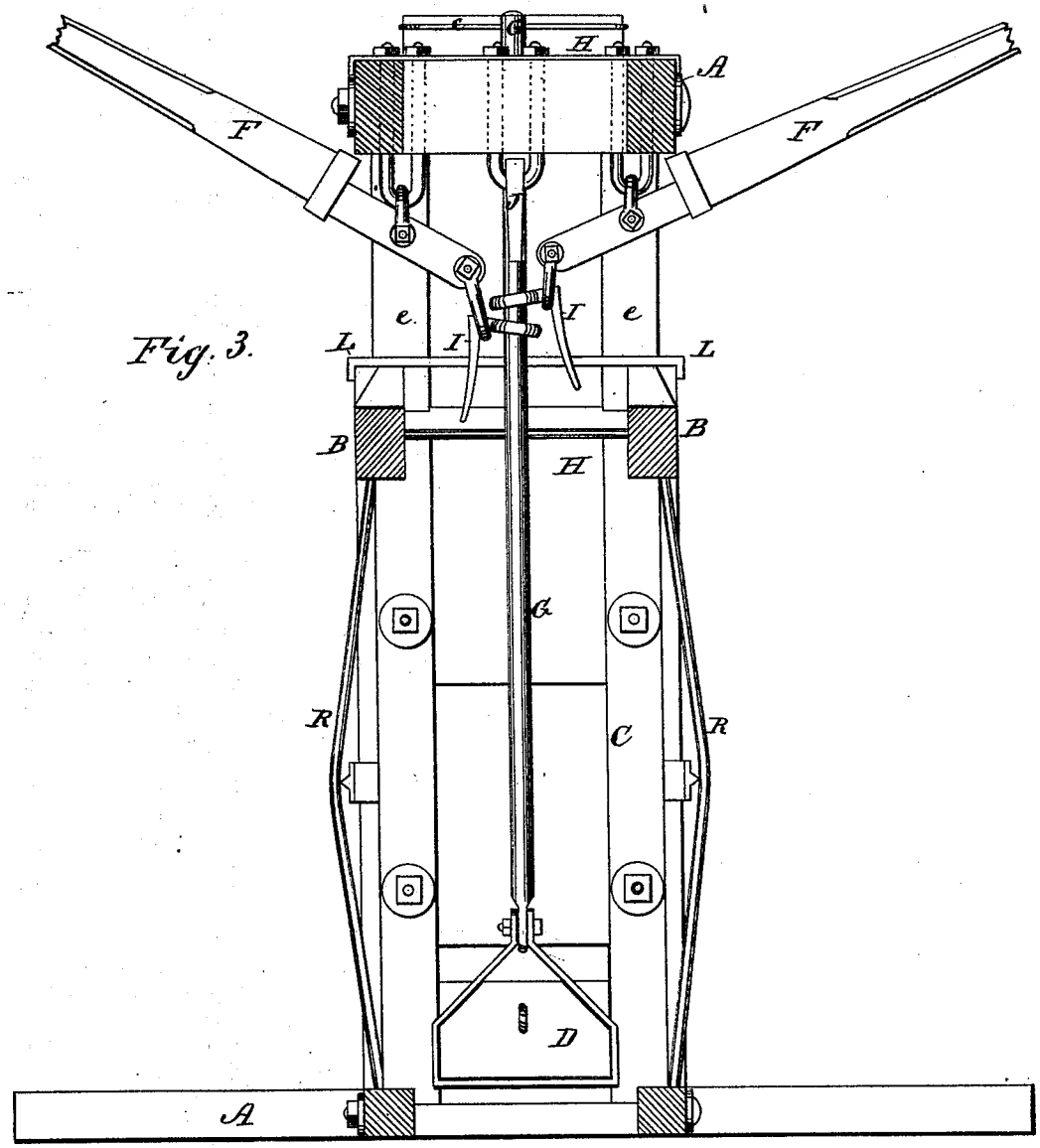

UNITED STATES PATENT OFFICE.

ISAAC N. WARD, OF HENRYVILLE, AND HUGH R. WHITE, OF LAWRENCE-BURG, TENNESSEE.

IMPROVEMENT IN HAY AND COTTON PRESSES.

Specification forming part of Letters Patent No. 182,975, dated October 3, 1876; application filed August 1, 1876.

*To all whom it may concern:*

Be it known that we, ISAAC N. WARD, of Henryville, in the county of Lawrence and State of Tennessee, and HUGH R. WHITE, of Lawrenceburg, in the county of Lawrence and State of Tennessee, have invented a new and Improved Hay and Cotton Press; and we do hereby declare that the following is a full, clear, and exact description of the same.

Our invention is an improvement in that class of presses having a baling-box with removable head and sides.

The improvement relates to the construction and arrangement of parts, as herein described and claimed.

Figure 1:
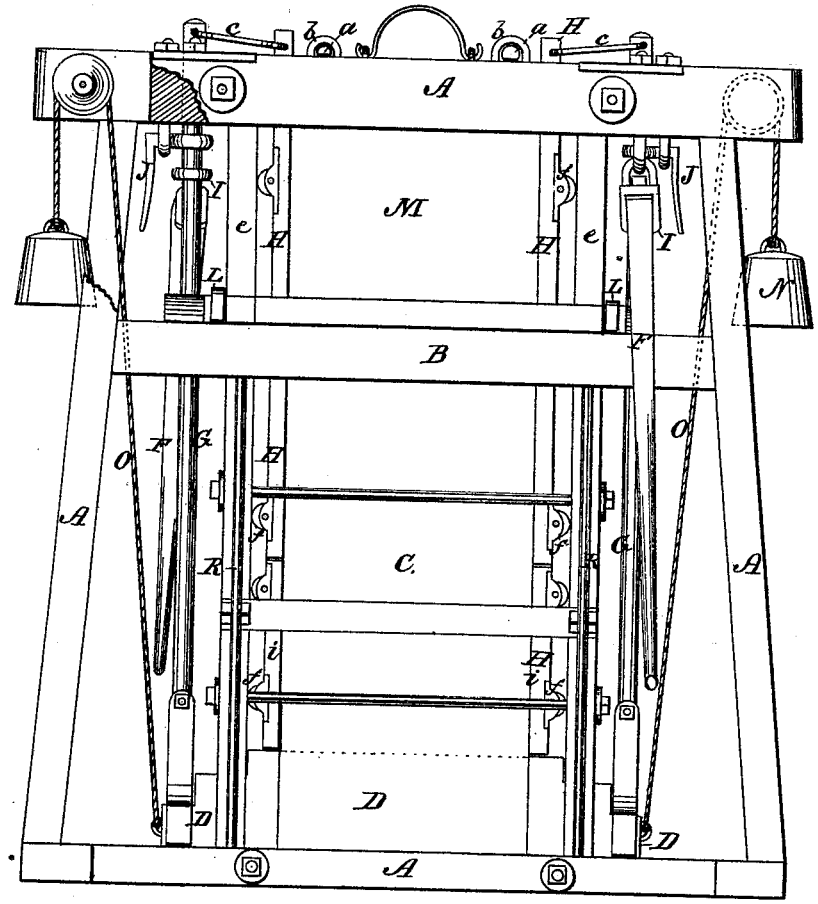
Figure 2:
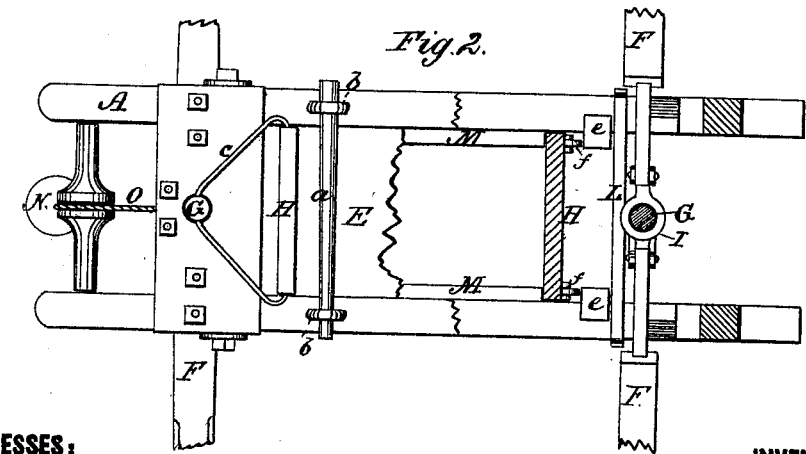

In the accompanying drawings, forming part of this specification, Figure 1 is a side elevation of our improved press; Fig. 2, a plan view with part broken away; and Fig. 3, a vertical section on line $x\,x$, Fig. 1.

The frame A of the press is essentially rectangular in form, and substantially built. That part of the frame above the horizontal beams B contains the baling box or chamber, while the portion C, below said beams, constitutes the lower half of the press-box, of which the follower D is the movable bottom. When the press is to be operated the cross-bars $a\,a$, Fig. 2, are removed from the staples $b\,b$, and the head E lifted out. The cotton or other material to be baled is then filled into the box till it is full. The head E is then replaced and secured by the aforesaid cross-bars $a\,a$, and the follower raised by operating the levers F. Said levers are four in number, arranged in pairs at the ends of the press, and each suspended from the top of the frame by means of links or staples, which also constitute their fulcra. Vertical rods G are attached to the projecting ends of the follower D, and work through guides at the top of the press. Their upper ends are connected by pivoted links or bails $c\,c$ with the sliding ends H of the press, so that, as the follower is raised, the said ends will be raised also. The means of connection between the levers and rods are clamps or dogs I, which consist of a head encircling the rods, and an arm bent downward parallel, or nearly so, to the rods, and forming a hook to engage the links pivoted to the ends of levers F. All the levers F are vibrated together up and down so that the follower will be kept horizontal while being raised.

As a means for holding the follower, or, rather, preventing it moving downward while the longer arms of the levers F are being raised and the dogs I allowed to slide down on the rods G to take a new hold, we employ similar dogs, J, which are suitably pivoted to the top of the frame A.

The range of movement of the follower is two-thirds or thereabout of the length of the press, and hence, when the press-box is filled with the cotton, the latter is compressed two-thirds of its volume to form a bale. The follower is, in such case, raised to a point just above the beams B, where its movement is arrested. The ends H of the press-box having been raised with it, they of course project above the top of the press two-thirds of their length. They are made in two sections, the length of the lower ones $i$ being the same as the height of the baling-box.

To remove the bale, the clamps L, that confine the sides M of the baling-box, are first detached, thus allowing the sides, corner-posts $e$, and lower sections $i$ of the ends H to be successively detached. Before, however, the lower sections $i$ of the sliding ends H can be removed, the upper sections thereof require to be raised and supported upon the top of the frame A, for, in the pressing operation, they rest directly upon said lower sections $i$. The bale being exposed on all sides by removal of sides and ends of the baling-box, the ties or bands may readily be fastened around it, and then, upon lowering the follower a few inches, the bale may be easily removed from the press.

To prepare the press for another operation, the detachable end sections $i$ are first replaced, then the corner-posts $e$, next the sides M, and finally the clamps L, which hold all these parts locked firmly together in their proper positions. It is then necessary that the follower D should be returned to the bottom of the press-box C, and, to enable this to be done, it is necessary to release the clamps or dogs I J, so that the rods G can slide through them. This is effected by pressing the pendent arms of all the clamps inward toward the rods, Owing to the weight of the follower and its attachment it would naturally descend too rapidly, and hence we provide counter-balance weights N, which are attached to the follower and suspended by cords O, passing over pulleys in the top of the frame A. It is obvious that the weights H also aid materially in raising the follower in the baling operation.

The excessive pressure to which the cotton is subjected necessarily causes great friction on the ends H as they move up with the follower. To reduce this, so far as practicable, we attach rollers $f$ to the said ends H, as shown, and arrange them to run on iron track-rods attached to the corner-posts of the press-box.

The sides of the lower portion C of the press-box are strengthened or stayed and prevented from bulging by the truss-braces or tension-rods R, applied vertically, as shown. (Figs. 1 and 3.)

What we claim is—

1. The combination, with a baling-box provided with sliding ends, of the bails and rods G, as shown and described, so as to steady the said sliding ends.

2. The combination, with the removable sides M and sliding ends H, of the detachable corner-posts $e$, fitting in mortises, and of the dogs or clamps L, engaging the projecting portions of sides M, all constructed and arranged as shown and described, for the purpose specified.

3. The sliding ends H of the press-box, provided with friction-rollers, in combination with the follower and the corner-posts of the press-box, as shown and described.

I. N. WARD.
H. R. WHITE.

Witnesses to the signature of WHITE:
JAMES H. GRIDLEY,
SOLON C. KEMON.

Witnesses to the signature of WARD:
JOHN T. ALLEN,
DANIEL HARVEY.